(12) United States Patent
Jeffries et al.

(10) Patent No.: US 10,337,221 B2
(45) Date of Patent: Jul. 2, 2019

(54) SLAM LATCH FOR TOOL BOX

(71) Applicant: Austin Hardware & Supply, Inc., Lee's Summit, MO (US)

(72) Inventors: Mark Steven Jeffries, Buford, GA (US); Norman Allen Smith, Buford, GA (US)

(73) Assignee: Austin Hardware And Supply, Inc., Lee's Summit, MO (US)

( * ) Notice: Subject to any disclaimer, the term of this patent is extended or adjusted under 35 U.S.C. 154(b) by 0 days.

(21) Appl. No.: 15/295,711

(22) Filed: Oct. 17, 2016

(65) Prior Publication Data

US 2017/0037665 A1   Feb. 9, 2017

Related U.S. Application Data

(63) Continuation of application No. 14/072,128, filed on Nov. 5, 2013, now Pat. No. 9,469,181, which is a
(Continued)

(51) Int. Cl.

| E05B 83/16 | (2014.01) |
|---|---|
| E05C 9/18 | (2006.01) |
| B60J 7/19 | (2006.01) |
| E05B 83/18 | (2014.01) |
| E05C 19/06 | (2006.01) |
| B60J 7/16 | (2006.01) |
| E05B 53/00 | (2006.01) |
| E05B 83/24 | (2014.01) |
| B25H 3/02 | (2006.01) |
| E05C 9/08 | (2006.01) |

(Continued)

(52) U.S. Cl.
CPC ............. *E05C 9/1808* (2013.01); *B25H 3/02* (2013.01); *B60J 7/1621* (2013.01); *B60J 7/198* (2013.01); *B65D 43/16* (2013.01); *B65D 43/22* (2013.01); *E05B 53/003* (2013.01); *E05B 63/22* (2013.01); *E05B 65/5246* (2013.01); *E05B 83/16* (2013.01); *E05B 83/18* (2013.01); *E05B 83/247* (2013.01); *E05C 9/08* (2013.01); *E05C 19/06* (2013.01); *E05B 5/00* (2013.01); *E05B 2015/023* (2013.01); *Y10S 292/11* (2013.01); *Y10T 292/1083* (2015.04)

(58) Field of Classification Search
CPC ......... E05C 9/08; E05B 5/00; E05B 2015/023
USPC ........ 292/4, 5, 7, 44, 50, 52, 54, 57, 59, 63, 292/69, 200, DIG. 11
See application file for complete search history.

(56) References Cited

U.S. PATENT DOCUMENTS

| 1,809,720 | A | * | 6/1931 | Mears | ............. | E05B 83/247 |
| | | | | | | 292/215 |
| 1,820,238 | A | * | 8/1931 | Mears | ............. | E05B 83/247 |
| | | | | | | 292/215 |
| 1,865,778 | A | * | 7/1932 | Mears | ............. | E05B 83/247 |
| | | | | | | 292/215 |
| 1,934,137 | A | * | 11/1933 | Moore | ............. | E05B 83/247 |
| | | | | | | 292/214 |
| 2,218,683 | A | * | 10/1940 | Miller | ............. | E05B 83/247 |
| | | | | | | 292/26 |

(Continued)

FOREIGN PATENT DOCUMENTS

FR    1465494 A  *  1/1967  ........... E05B 83/247

*Primary Examiner* — Carlos Lugo

(74) *Attorney, Agent, or Firm* — Polsinelli PC

(57) ABSTRACT

A slam type locking mechanism is described. The locking mechanism allows a storage container with the locking mechanism to be slammed shut in a single motion. The operator may slam the lid or door to the container using a single hand that is only pressing or pushing the lid or door closed. The slam type locking mechanism includes a lock having a lock housing, a handle, and a spring loading mechanism. The handle is rotatably engaged to the spring
(Continued)

loading mechanism. The rods are in a rotational engagement with the lock, wherein the rods have an offset that interacts with a striker on the container or lid in a locking relationship.

20 Claims, 9 Drawing Sheets

Related U.S. Application Data continuation-in-part of application No. 12/134,573, filed on Jun. 6, 2008, now Pat. No. 9,309,701.

(51) Int. Cl.
*B65D 43/16* (2006.01)
*B65D 43/22* (2006.01)
*E05B 63/22* (2006.01)
*E05B 65/52* (2006.01)
*E05B 5/00* (2006.01)
*E05B 15/02* (2006.01)

(56) References Cited

U.S. PATENT DOCUMENTS

| | | | | |
|---|---|---|---|---|
| 2,327,735 A * | 8/1943 | Neunherz | | A47D 7/02 |
| | | | | 292/37 |
| 2,837,363 A * | 6/1958 | Eichner | | E05B 83/247 |
| | | | | 292/217 |
| 3,596,952 A * | 8/1971 | Hinkle | | E05C 9/08 |
| | | | | 292/124 |
| 4,657,292 A * | 4/1987 | Bruck | | E05B 77/06 |
| | | | | 292/80 |
| 4,784,414 A * | 11/1988 | Free | | E05C 9/08 |
| | | | | 292/336.3 |
| 4,862,641 A * | 9/1989 | McCarty | | E05C 19/06 |
| | | | | 292/262 |
| 6,497,445 B1 * | 12/2002 | Combs, II | | B60J 7/1621 |
| | | | | 296/100.06 |
| 9,309,701 B2 * | 4/2016 | Jeffries | | B25H 3/02 |
| 9,469,181 B2 * | 10/2016 | Jeffries | | B60J 7/198 |

* cited by examiner

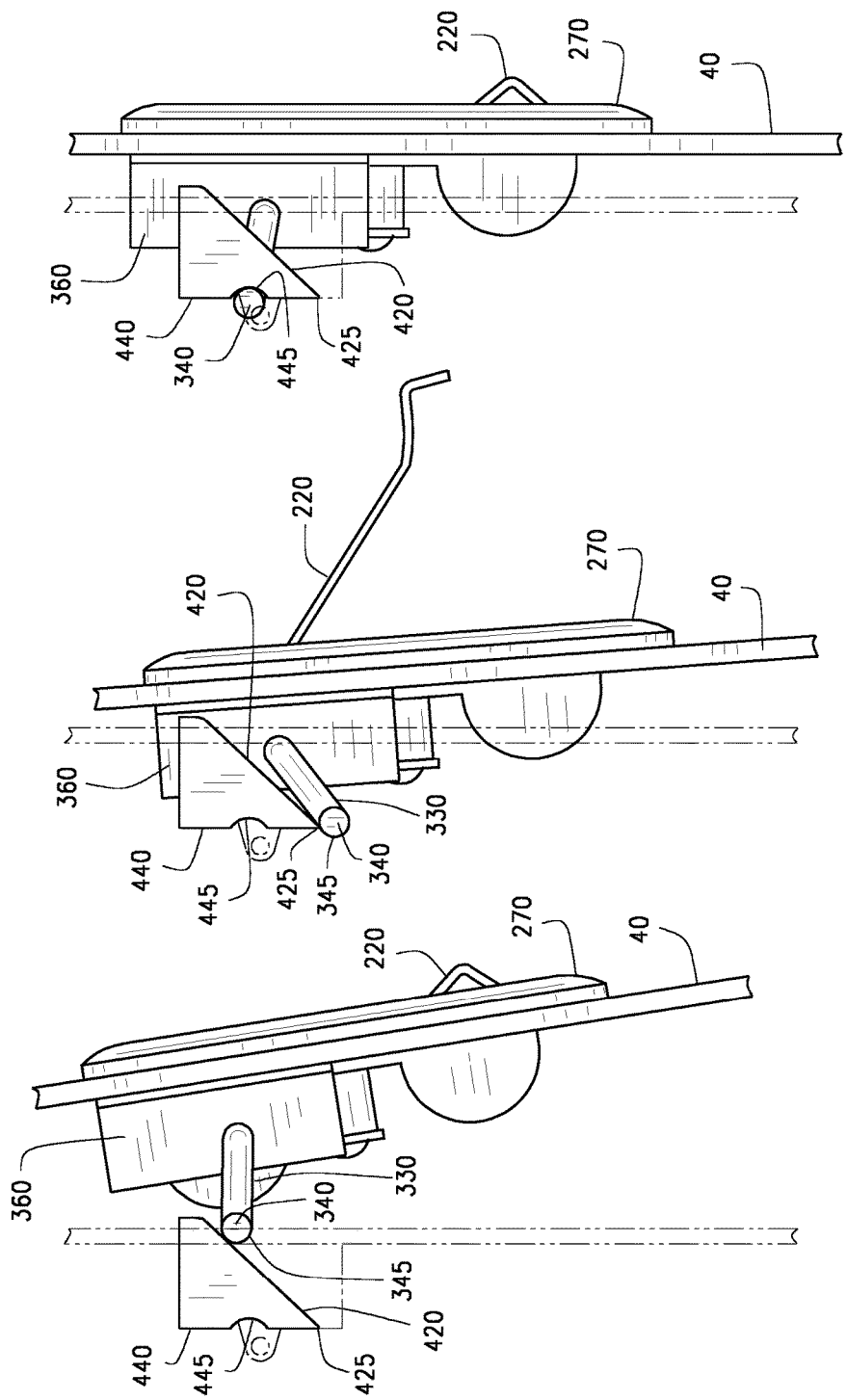

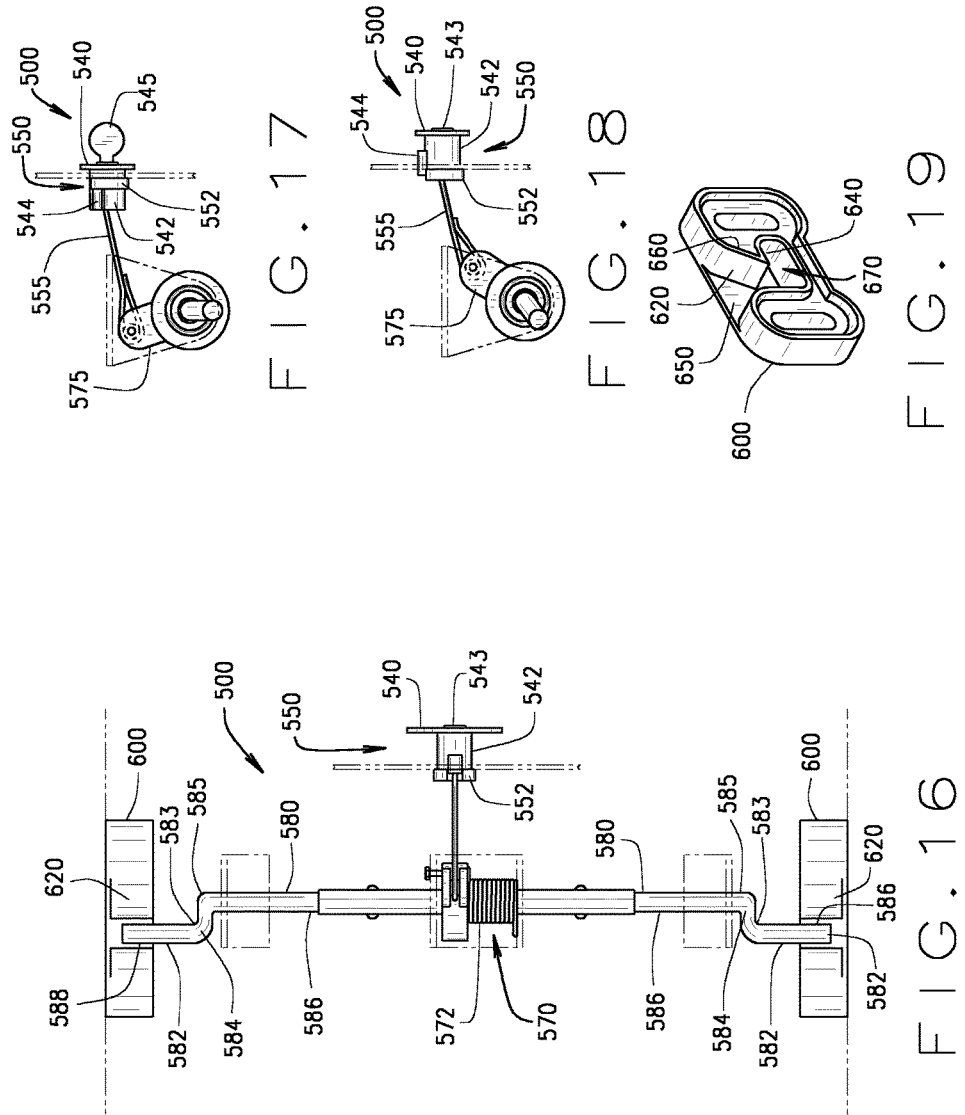

SLAM LATCH FOR TOOL BOX

CROSS REFERENCE TO RELATED APPLICATION

This application is a Continuation of U.S. patent application No. Ser. No. 14/072,128, filed Nov. 5, 2013, which is a Continuation-In-Part of U.S. patent application Ser. No. 12/134,573 filed Jun. 6, 2008, which are both hereby incorporated by reference in their entireties.

FIELD OF THE INVENTION

The present invention relates to a slam latch for a storage container, such as a toolbox or storage compartment in or on a vehicle.

SUMMARY OF INVENTION

A slam latch, i.e., a locking mechanism, for a storage container, such as a toolbox or storage compartment in or on a vehicle, such as emergency response vehicles (ambulances, rescue vehicles, fire trucks, etc.), buses, shuttle buses, cargo trucks, vans, pick-up trucks, etc. is described herein. The slam latch may also be used for the doors and lids of stationery housings and compartments, such as an electrical housing or a mechanical housing.

In one aspect, a locking mechanism assembly is described. The locking mechanism assembly comprises a lock comprising a lock housing, a paddle handle, and a spring loading mechanism, wherein the paddle handle is rotatably engaged to the spring loading mechanism. A rod is in a rotational engagement with the lock, wherein the rod has an offset that interacts with a striker in a locking relationship.

In another aspect, a storage container is described. A lid is hingedly connected to the container. The storage container comprises a plurality of walls defining or forming the container. The container or the lid comprises a striker. A lock comprises a handle and a spring loading mechanism, wherein the handle is rotatably engaged to the spring loading mechanism. A rod is in a rotational engagement with the lock, and the rod having an offset that interacts with the striker in a locking relationship. The lock allows the storage container to be slammed shut in a single motion.

In another aspect, a toolbox having a slam latch is described. The toolbox comprises a plurality of walls forming a container having a rim. The container comprises a plurality of strikers proximate the rim. A lock for the container comprises a paddle handle, a spring loading mechanism, and an axle. The lock is in operable or rotational communication with a plurality of rods via the axle, wherein each rod includes a first bend leading to a transition portion and a second bend from the transition portion leading to an offset, and each offset interacts with one of the plurality of strikers in a locking relationship. The spring loading mechanism urges the rods to a locked position. A lid is hingedly connected to the container, wherein the lock is mounted on or into the lid.

In another aspect, a tonneau cover latching mechanism is described. The tonneau cover latching mechanism provides for the tonneau cover to be slammed or closed shut in a single motion and engage at two points on the pick-up truck to secure the tonneau cover in a closed position.

In another aspect, a tonneau cover latching mechanism is described. The tonneau cover latching mechanism includes a handle. A link is engaged to the handle. The link is engaged to a spring loading mechanism. A first rod is rotatably engaged to the spring loading mechanism. A second rod is rotatably engaged to the spring loading mechanism. The first rod engages and disengages a first striker. The second rod engages and disengages a second striker.

In another aspect, a tonneau cover latching mechanism is described. The tonneau cover latching mechanism includes a handle. A link is engaged to the handle. The link is engaged to a spring loading mechanism. A rod is rotatably engaged to the spring loading mechanism. The rod rotates to engage and disengage a striker. The locking mechanism translates a pulling force applied by a user to the handle into a rotational force that rotates the rod to disengage the rod from the striker.

In another aspect, a tonneau cover is described. The tonneau cover includes a cover for a bed of pick-up truck. The cover is movable between an open position and a closed position. A locking mechanism is attached or integrated with the cover. The locking mechanism includes a handle. A link is engaged to the handle. The link is engaged to a spring loading mechanism. A first rod is rotatably engaged to the spring loading mechanism. A second rod is rotatably engaged to the spring loading mechanism. The first rod engages and disengages a first striker. The second rod engages and disengages a second striker.

DESCRIPTION OF FIGURES

FIG. 3 shows the interaction of the locking mechanism with the striker.

FIG. 4 shows the interaction of the locking mechanism with the striker as the lid is closed.

FIG. 5 shows the interaction of the locking mechanism with the striker when the lid is closed.

FIG. 16 is a view of the tonneau cover latching mechanism disengaging from the strikers.

FIG. 17 is a side view of the tonneau cover latching mechanism in the locked position.

FIG. 18 is a side view of the tonneau cover latching mechanism disengaging from the strikers.

FIG. 19 is a perspective view of the striker.

DETAILED DESCRIPTION OF EMBODIMENTS

A slam type locking mechanism is described. The locking mechanism allows the storage container to be slammed shut in a single motion. The operator may slam the lid or door to the container using a single hand that is only pressing or pushing the lid or door closed. The operator need not directly manipulate or actuate the locking mechanism (i.e., pull on a handle or twist a knob), while slamming the lid or door shut to a closed position. The pressing or pushing of the lid to the closed position engages the locking mechanism to retain the lid in a closed position.

Figure 1:
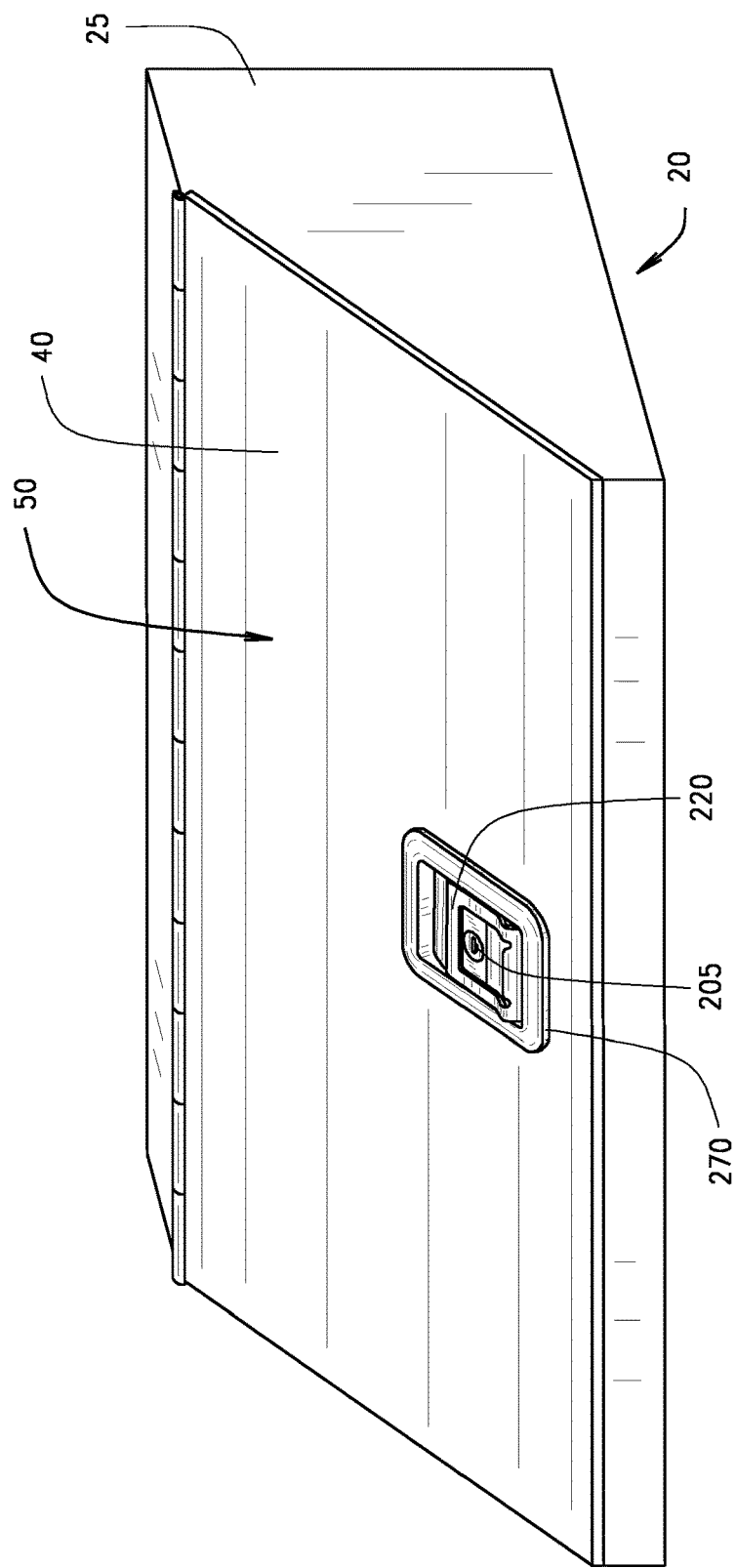
FIG. 1 is a perspective view of a container including the slam latch.
Figure 2:
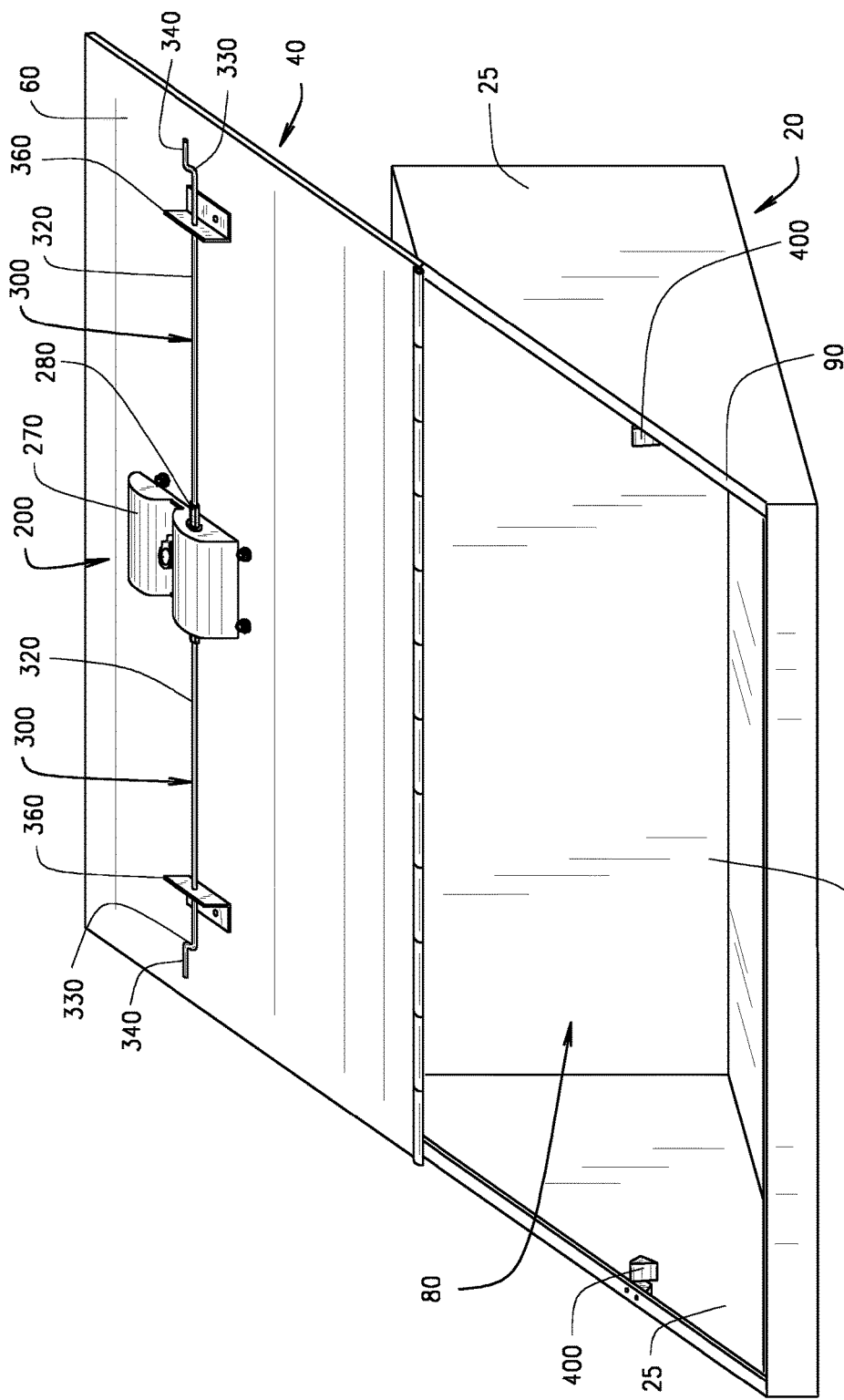
FIG. 2 is a perspective view of the container with the lid in an open position.

As shown in the FIGS. 1 and 2, a container 20 includes a lid 40 with an outer surface 50 and an inner surface 60. The lid 40 is hingeably or openably connected to the container 20. Gas springs, torsion springs, or the like urge the lid 40 to an open position and support the lid 40 in the open position. The container 20 includes a plurality of walls 25 defining a compartment 80 providing a storage area. A container rim 90 defines an opening to the compartment 80.

A locking mechanism assembly 100 for locking the lid 40 in a closed position relative to the container 20 will now be described. The locking mechanism assembly 100 comprises a lock 200 in rotatable engagement with rods 300 that interacts with a plurality of strikers 400 positioned proximate or around the container rim 90 in a locking relationship to lock the lid 40 closed. The rod 300 rotates against and around the strikers 400 to secure the lid 40 in a closed position.

Figure 6:
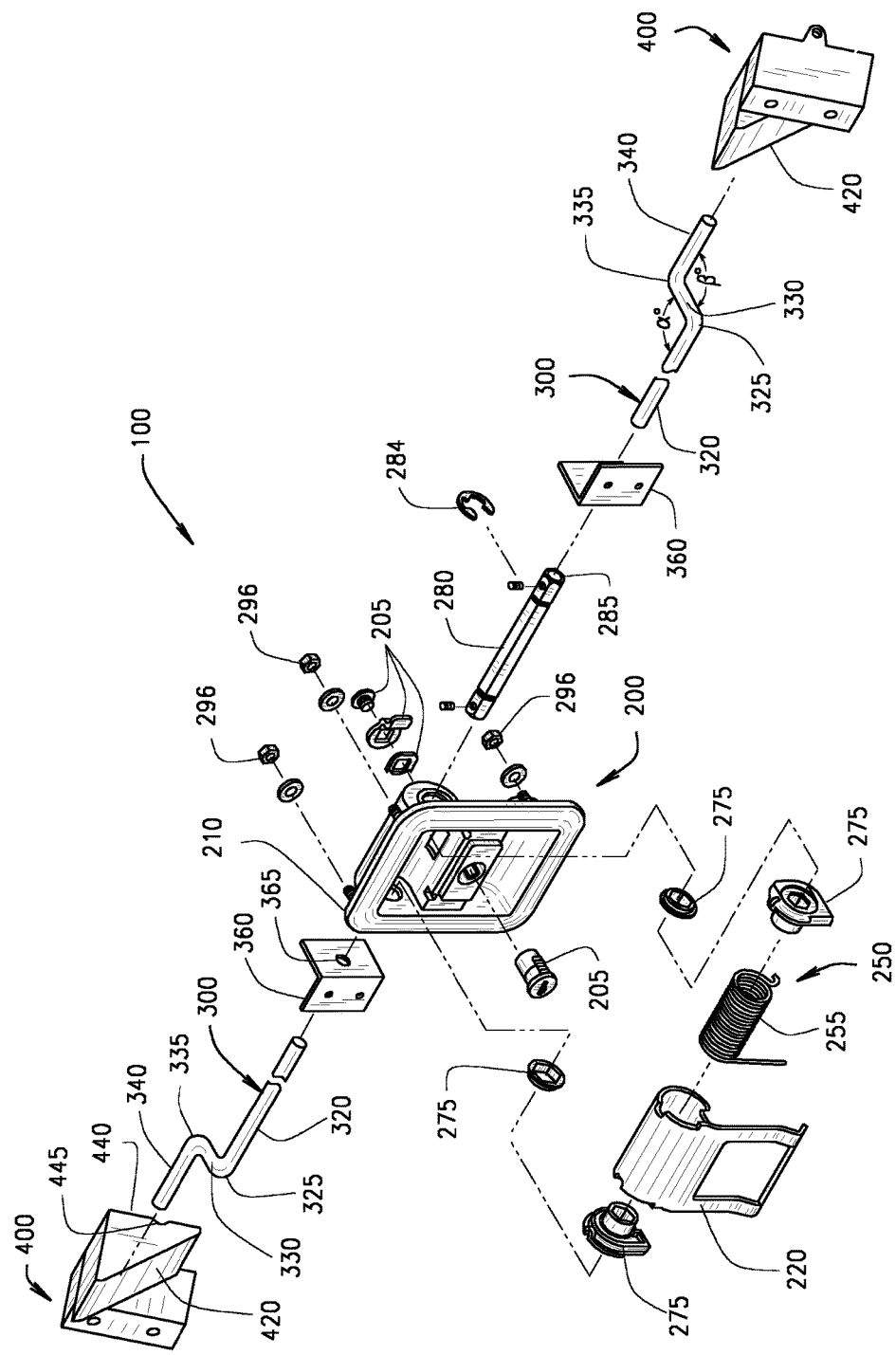
FIG. 6 is an exploded view of the locking mechanism.
Figure 7:
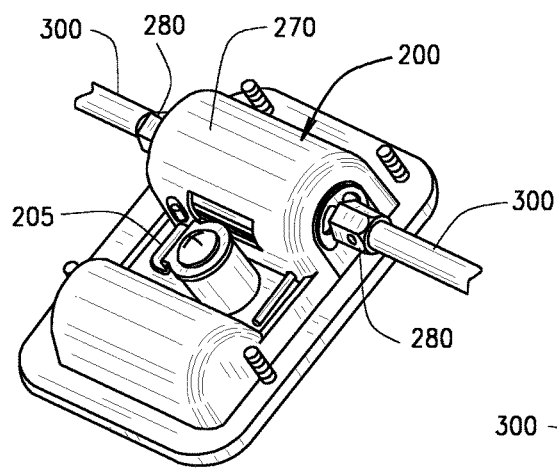
FIG. 7 shows the lock of the locking mechanism in the open position.
Figure 8:
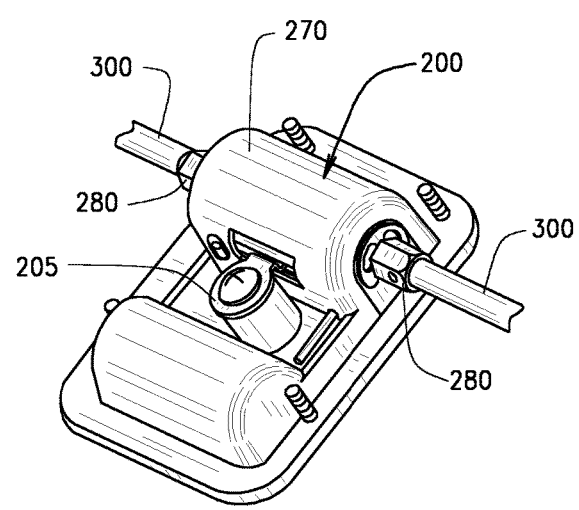
FIG. 8 shows the lock of the locking mechanism in the locked position.
Figure 9:
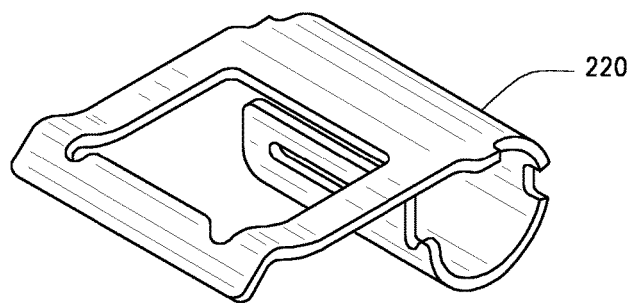
FIG. 9 shows a perspective view of the paddle handle.
Figure 10:
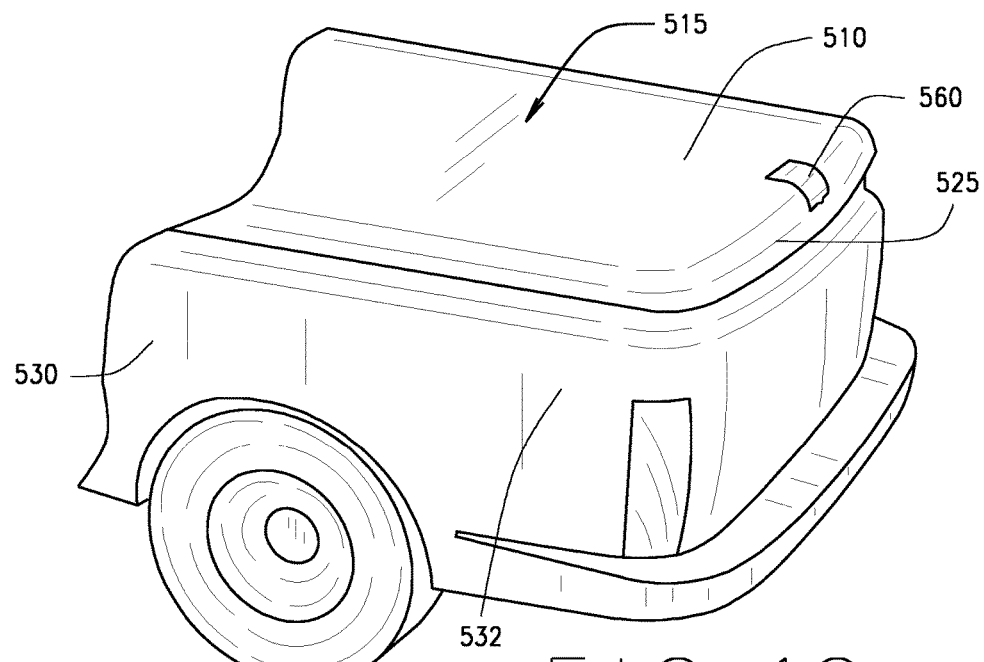
FIG. 10 is a perspective view of the pick-up truck with the tonneau cover in the closed position.
Figure 11:
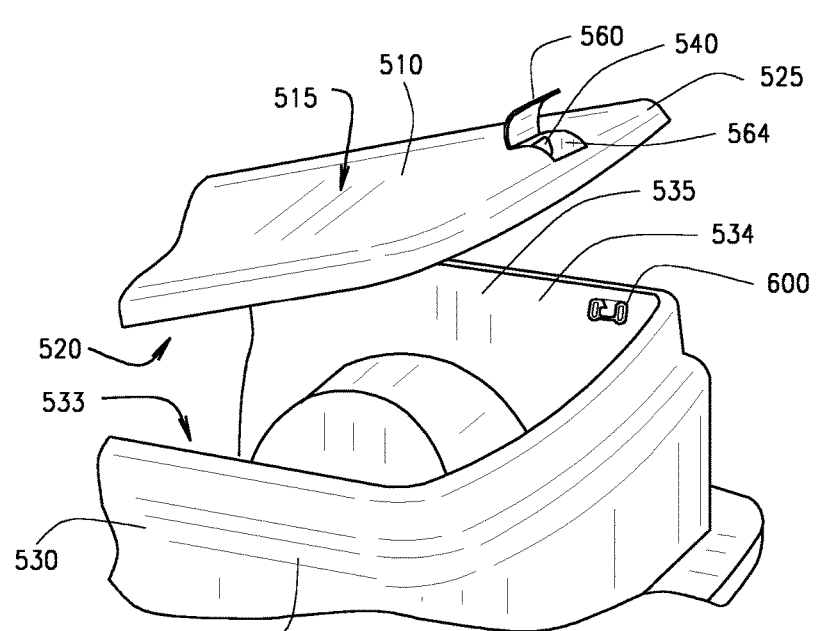
FIG. 11 is a perspective view of the pick-up truck with the tonneau cover in the open position.

With reference to FIG. 6, the lock 200 comprises a paddle handle 220, a lock housing 270, an axle 280, and a spring loading mechanism 250. The spring loading mechanism 250 includes a spring 255. The spring loading mechanism 250 operably connects the paddle handle 220 to the rods 300 via the axle 280. The paddle handle 220 is rotatably engaged to the spring loading mechanism 250 and the axle 280.

The axle 280 connects or attaches the rods 300 to the lock 200. The axle 280 is in rotational communication with the spring loading mechanism 250. Bushings 275 assist in stabilizing and transferring rotational forces of the spring 255 of the spring loading mechanism 250 to the axle 280 and ultimately to the paddle handle 220. The bushings 275 also assist in transferring rotational forces from the axle 280 to the spring 255. The axle 280 may include openings 285 that receive or attach to the rods 300. The axle 280 may also connect directly to the rods 300, or a single rod 300 may replace the axle 280 and be in direct operational communication with the spring loading mechanism 250.

As shown in FIGS. 3-5, the operator actuates the paddle handle 220 that is connected to or attached to the rods 300 via the spring loading mechanism 250 to unlock the locking mechanism assembly 100 and open the lid 40 to access the compartment 80. When the operator pulls on the paddle handle 220, the spring loading mechanism 250 translates the pulling force to a rotational force that rotates the rods 300 to disengage the rods 300 from the strikers 400. In some embodiments, the lock 200 may further comprise a key and a locking means 205, such as a bolt, pin, rotating clip, or the like to maintain the lock 200 in a closed and locked position.

The spring loading mechanism 250 in the lock 200 urges the paddle handle 220 towards and to a closed position. When the operator pulls on the paddle handle 220 with sufficient force, the force of the spring loading mechanism 250 on the rods 300 is overcome, and the pulling force on the paddle handle 220 is transferred via the spring loading mechanism 250 to the rods 300, and the rods 300 rotate and the locking mechanism assembly 100 may disengage from the strikers 400.

The rods 300 are generally a linear, metal member including bends and angles, such that the rods 300 engage and disengage the strikers 400 as the rods 300 are rotated. The rods 300 comprises a central axis 320, a transition portion 330, and an offset 340. On the side of the central axis 320 away from the lock 200, the central axis 320 includes a first bend 325 leading to the transition portion 330, and a second bend 335 from the transition portion 330 leading to the offset 340.

The rod 300 and the paddle handle 220 have approximately the same axis of rotation. The locking motion of the locking mechanism assembly 100 latches and unlatches the lock 200 on one central axis.

In the embodiment shown, the first bend 325 has an angle $\alpha$ of approximately 110 to approximately 130 degrees between the central axis 320 and the transition portion 330. The second bend 335 also has an angle $\beta$ of approximately 110 degrees to approximately 130 degrees between the transition portion 330 and the offset 340. The angle $\alpha$ of the second bend 335 is generally opposite to the angle $\beta$ of the first bend 325. As such, the offset 340 and the central axis 320 are generally in a parallel configuration.

The locking mechanism assembly 100 is generally attached or mounted integral to the lid 40, such as by the nuts 296. The locking mechanism assembly 100 includes the lock housing 270. Typically, as shown in the figures, the locking mechanism assembly 100 is positioned with the paddle handle 220 extending from the lock housing 270, while the lock housing 270 is mounted on or into the lid 40. The lock housing 270 contains the spring loading mechanism 250. The rods 300 connect with the axle 280, which extends into through the lock housing 270 on the inner surface 60 side of the lid 40. As such, the paddle handle 220 is exterior to the toolbox 20 and is readily accessible when the lid 40 is in a closed position.

The rods 300 are further supported in a rotational engagement by brackets 360. The brackets 360 include a hole 365. The rod 300 extends through the hole 365 in the bracket 360. As the brackets 360 are positioned proximate the strikers 400, the brackets 360 provide a reinforcing structure for the locking mechanism assembly 100.

A plurality of strikers 400 are positioned around the container rim 90 to interact in a locking arrangement with the offsets 340. The strikers 400 are mounted in a stationary relationship relative to the container 20 and the rim 90. In the embodiment shown, two strikers 400 engage and disengage with the offsets 340 of the rods 300. The strikers 400 are positioned on opposite sides of the container 20.

The strikers 400 comprise a contact surface 420 and a locking surface 440. The contact surface 420 is a generally planar surface. The locking surface 440 includes an optional notch 445 that holds the diameter of the offset 340. In other embodiments, the locking surface 440 includes a plurality of the optional notches 445.

In a closing action of the lid 40, an outer periphery 345 of the offset 340 contacts the contact surface 420 of the striker 400, and the offset 340 rotates as it slides on the contact surface 420 of the striker 400, compressing the spring loading mechanism 250 until the offset 340 reaches an end 425 of the contact surface 420, and the offset 340 then snaps under the striker 400, by the action of the spring loading mechanism 250, to a resting position on the locking surface 440 on a rear side of the striker 400. In the closing action of the lid 40, the operator need only slam the lid 40 shut, as there is no need to actuate the paddle handle 220. As described, the contact of the outer periphery 345 of the offset 340 to the contact surface 420 of the striker 400 causes the offset 340 to rotate. This contact of the offset 340 to the contact surface 420 overcomes the force of the spring loading mechanism 250 in the lock 200 causing the offset 340, and consequently to the rod 300, to rotate and compress the spring loading mechanism 250 until the offset 340 reaches the end 425 of the contact surface 420.

When the lid 40 is already in a closed position and the operator desires to open the lid 40, the operator pulls on the paddle handle 220, which rotates the rod 300 and its offset 340. The offset 340 is rotated from the locking surface 440 around the striker 400, thus releasing the locking mechanism assembly 100 such that the lid 40 may be opened.

The locking mechanism assembly 100 provides two contact points, i.e., the strikers 400 on either side of the lid 40. This provides increased security.

The rods 300 may rotate up to approximately 80 to approximately 85 degrees. In this embodiment, this amount of rotation of the rod 300 provides for the offset 340 to slide on the contact surface of the striker 400 and then snap under the striker 400. In other embodiments, the rods 300 may rotate up to approximately 150 or to approximately 180 degrees, depending upon the interface between the offset 340 and the striker 400. The amount of rotation needed will vary depending on the length of the transition portion 330, the size and shape of the striker 400, etc.

Although a paddle handle 220 is shown in the Figures, other handles, pulls, knobs, etc. may be used with the present invention to rotate the rod 300 to engage and disengage the rods 300 from the strikers 400.

The container 20 may be made from a variety of materials, including stainless steel, metals, and metal alloys. In other embodiments, the container 20 employing the locking mechanism assembly 100 may be made from rigid plastic materials. Although the locking mechanism assembly 100 has been described with reference to the container 20, which may be a toolbox, other storage containers, lockers, electrical service enclosures, cabinets may employ the locking mechanism assembly 100.

In alternative embodiments, the locking mechanism 100 is configured with the lock 200 attached or mounted to the container 20. The rods 300 extend toward the walls 25 of the container 20. The strikers 400 are attached or mounted to the lid 40 in a fixed position. As the lid 40 closes, the strikers 400 are urged against the rods 300 in order secure the lid 40. Although the configuration of the lock mechanism 100 is now reversed, the locking mechanism 100 operates similarly to other the embodiments described herein.

In another aspect, the lock 200 does not use the key and locking means 205. In this aspect, the lock 200 only positively closes or latches the lid 40 closed. Anyone may open the lid 40 by pulling on the paddle handle 220 or other actuator. The lock 200 latches the lid 40 closed and keeps the lid 40 closed until the user pulls on the paddle handle 220 or otherwise actuates the lock 200. In certain application, such as emergency vehicles, the user requires immediate access to a closed container 20 without the necessity of a key. For example, emergency equipment may be stored in the container 20. The lock 200 latches the lid 40 closed and maintains the lid 40 in the closed position—but the lid 40 is not locked in the closed position and a key is not required for access to the container 20.

In another aspect, a tonneau cover latching mechanism for tonneau covers is described. Tonneau covers are lids or covers that engage a bed of a pick-up truck to cover or enclose the bed of the pick-up truck. The tonneau covers provide a trunk-like closure for the pick-up truck. Tonneau covers may cover all or a portion of the bed of the pick-up truck. Tonneau covers include rigid, semi-rigid, and flexible styles.

The tonneau cover latching mechanism provides for the tonneau cover to be slammed or closed shut in a single motion and engage at two points on the pick-up truck to secure the tonneau cover in a closed position. The operator may slam or close the tonneau cover using a single hand that is only pressing or pushing the tonneau cover closed. The operator need not directly manipulate or actuate the latching mechanism (i.e., pull on a handle or twist a knob), while slamming or moving the tonneau cover to the closed position. The pressing or pushing of the tonneau cover to the closed position engages the tonneau cover latching mechanism to retain the tonneau cover in the closed position. Further, the tonneau cover latching mechanism secures to two latching points on opposite sides of a bed of the pick-up truck. And, the latching mechanism may be locked closed. This provides for added security and strength to resist tampering and unauthorized access.

With reference to FIGS. 10-19, a tonneau cover latching mechanism 500 is described. A bed 530 of a pick-up truck includes a tonneau cover 510 with a top side surface 515 and an under side surface 520. The tonneau cover 510 is hingeably or openably connected to the bed 530. Upon unlatching the tonneau cover latching mechanism 500, the tonneau cover 510 may raise to an open position. Gas springs, torsion springs, or the like urge the tonneau cover 510 to the open position and support the tonneau cover 510 in the open position after the latching mechanism 500 is unlatched. The tonneau cover 510 may be made from a substantially rigid material such as, as steel, metal alloys, fiberglass, or the like. The tonneau cover 510 provides a secure closure to the bed 530 of a pick-up truck.

Figure 13:
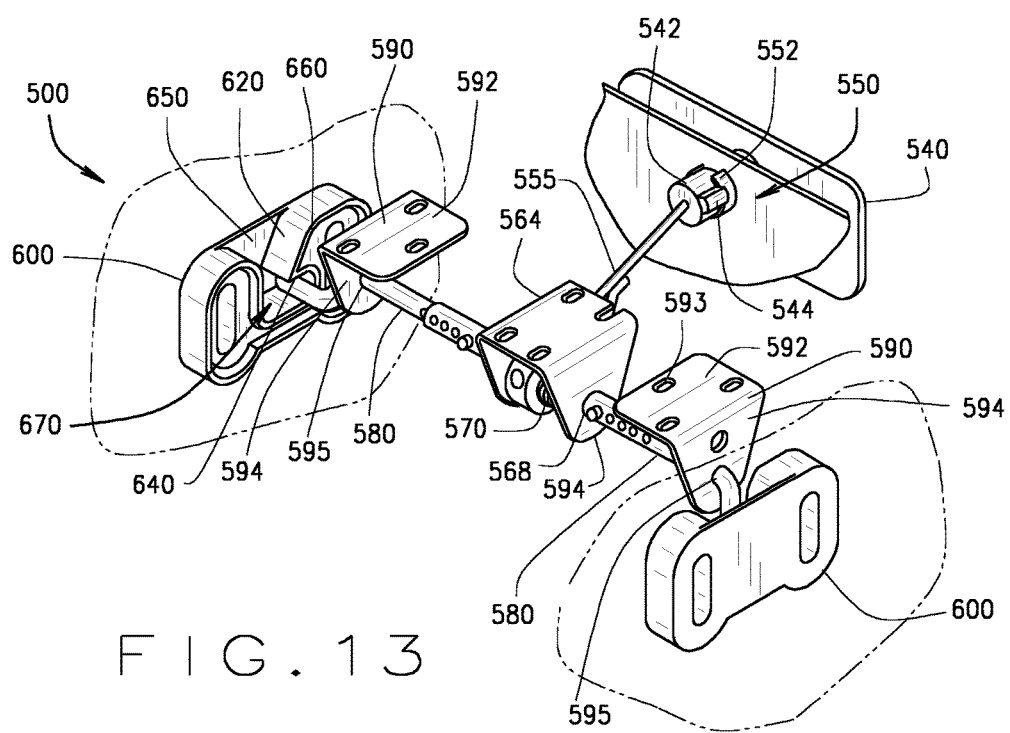
FIG. 13 is a perspective view of the tonneau cover latching mechanism.

The tonneau cover latching mechanism 500 secures and/or locks the tonneau cover 510 in a closed position relative to the truck bed 530. With reference to FIG. 13, the latching mechanism 500 comprises a spring loading mechanism 570 in rotatable engagement with rods 580 that interact with strikers 600 positioned on side rails 532, 534 of the bed 530 of the pick-up truck. The rods 580 engage the strikers 600 in a latching relationship to secure the tonneau cover 510 closed. The rods 580 rotate against and around surfaces of the strikers 600 to secure the tonneau cover 510 in the closed position.

Figure 14:
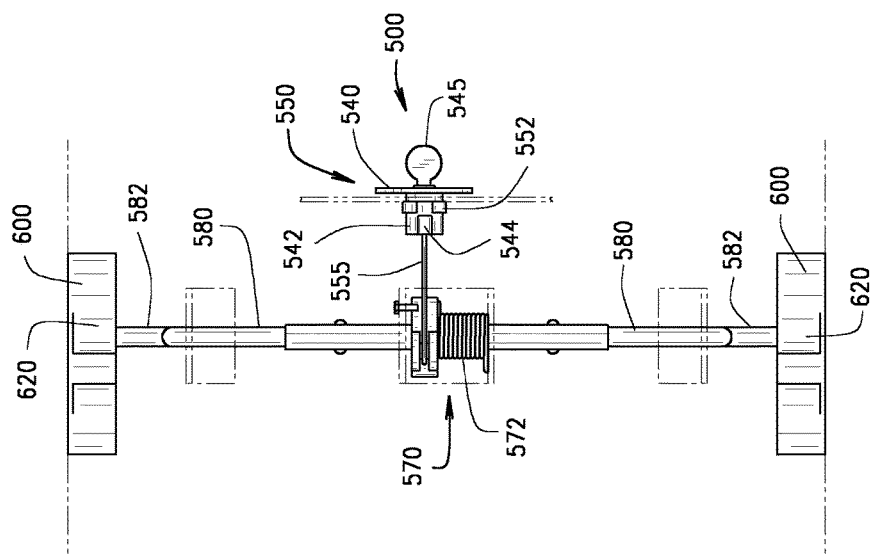
FIG. 14 is a view of the tonneau cover latching mechanism in the locked position.
Figure 15:
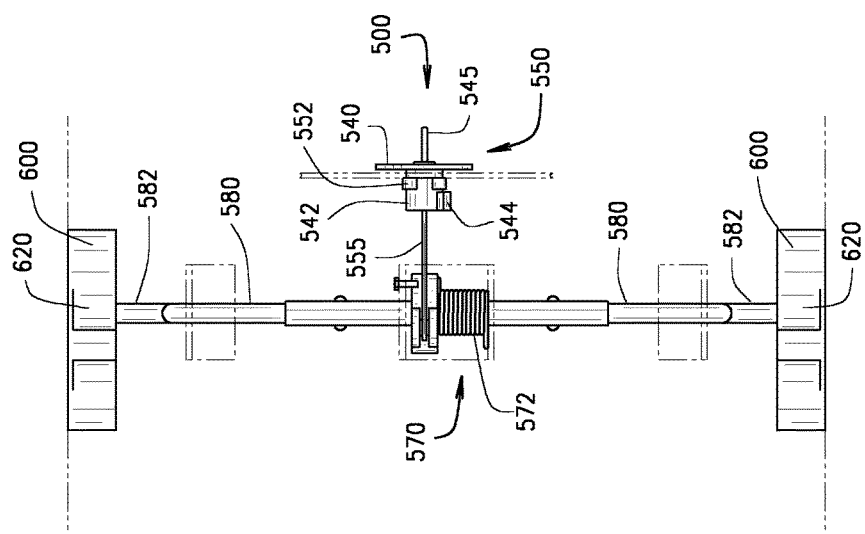
FIG. 15 is a view of the tonneau cover latching mechanism in the unlocked position.

With continued reference to FIG. 13, the latching mechanism 500 further comprises a handle 540. The handle 540 disengages the latching mechanism 500 to allow the tonneau cover 510 to open. A user may pull on the handle 540 to disengage the latching mechanism 500. The latching mechanism 500 may further comprise a lock assembly 550. The lock assembly 550 may lock the tonneau cover 510 closed. The lock assembly 550 may prevent the unlatching of the latch assembly 550 to provide security. The lock assembly 550 includes a lock cylinder 542 and a lock receiver 552. The lock assembly 550 may prevent the handle 540 from being pulled. The lock cylinder 542 includes a keyed opening 543 and a locking surface 544. The lock cylinder 542 is slideably and rotatably held by the lock receiver 552. As shown in FIGS. 14 and 15, the locking assembly 550 may be unlocked by manipulation of a key 545 in the keyed opening 543, which may free the locking surface 544 and allow the handle 540 to disengage the locking mechanism 500. The handle 540 may attach or connect with the lock cylinder 542. After unlocking, the lock cylinder 542 may slide forward in the lock receiver 552, as the user pulls on the handle 540.

The handle 540 and the lock cylinder 542 are connected to the spring loading mechanism 570 by a link 555, and pulling on the handle 540 results in a pulling force applied to the spring loading mechanism 570, which may overcome the force of the spring loading mechanism 570 and cause the rods 580 to rotate. The link 555 may include a linkage, cable, cord, rod, bar, etc. The spring loading mechanism 570 includes a spring 572 that urges the latching mechanism 500 to a closed position. The spring loading mechanism 570 includes a cam 575, shown in FIGS. 17 and 18, that receives the link 555. The spring loading mechanism 570 also connects to the rods 580. The handle 540 is engaged to the spring loading mechanism 570 via the link 555. When the handle 540 is pulled with sufficient force, the force of the spring 572 may be overcome, and the latching mechanism 500 may be disengaged.

The rods 580 engage or connect with the spring loading mechanism 570. The rods 580 pass through guide holes 568 of a lock housing 564, which stabilizes the rotation of the rods 580. In other aspects, a single rod 580 may replace the rods 580 and be in operational engagement with the spring loading mechanism 570.

As shown in FIG. 16, the operator actuates the handle 540 that is connected to the spring loading mechanism 570 to disengage the latching mechanism 500 and open the tonneau cover 510 to access the bed 530 of the pick-up truck. When the operator pulls on the handle 540, the link 555 pulls on the spring loading mechanism 570, which translates the pulling force to a rotational force that rotates the rods 580 to disengage the rods 580 from the strikers 600 and allows the tonneau cover 510 to open.

The spring loading mechanism 570 urges the handle 540 towards and to a closed position. When the operator pulls on the handle 540 with sufficient force, the force of the spring loading mechanism 570 on the rods 580 is overcome, and the pulling force on the handle 540 is transferred via the spring loading mechanism 570 to the rods 580, and the rods 580 rotate and disengage from the strikers 600. Now, the tonneau cover latching mechanism 500 is disengaged, and the tonneau cover 510 may open.

The latching mechanism 500 includes the lock housing 564. Typically, as shown FIGS. 11 and 12, the latching mechanism 500 is positioned with the handle 540 extending or protruding from a rear exterior surface 525 of the tonneau cover 510, while the lock housing 564 is mounted inside of or on the under side surface 520 of the tonneau cover 510. The lock housing 564 contains the spring loading mechanism 570. The rods 580 extend into and through the lock housing 564 to engage the spring loading mechanism 570.

With reference to FIG. 16, the rods 580 are a generally a linear, metal member including bends and angles, such that the rods 580 engage and disengage the strikers 600 as the rods 580 are rotated. The rods 580 comprise a central axis 586, a transition portion 584, and an offset 582. On the side of the central axis 586 away from the spring loading mechanism 570, the central axis 586 includes a first bend 585 leading to the transition portion 584, and a second bend 583 from the transition portion 584 leading to the offset 582.

From the lock housing 564, the rods 580 may pass through brackets 590, shown in FIG. 13. The brackets 590 provide support to the rods 580. The brackets 590 may be mounted to the under side surface 520 of the tonneau cover 510. The brackets 590 include a mounting surface 592 with mounting holes 593 to mount the brackets 590 to the under side surface 520 of the tonneau cover 510. The brackets 590 further include a guide surface 594 with guide holes 595. The guide surface 594 is generally perpendicular to the mounting surface 592. The rods 580 freely rotate in the guide holes 595.

In the embodiment shown, the first bend 585 has an angle of approximately 60 to approximately 120 degrees between the central axis 586 and the transition portion 584. The second bend 583 also has an angle of approximately 60 degrees to approximately 120 degrees between the transition portion 584 and the offset 582. The angle of the second bend 583 generally corresponds to the angle of the first bend 585 to provide the offset 582. As such, the offset 582 and the central axis 586 are generally in a parallel configuration.

Figure 12:
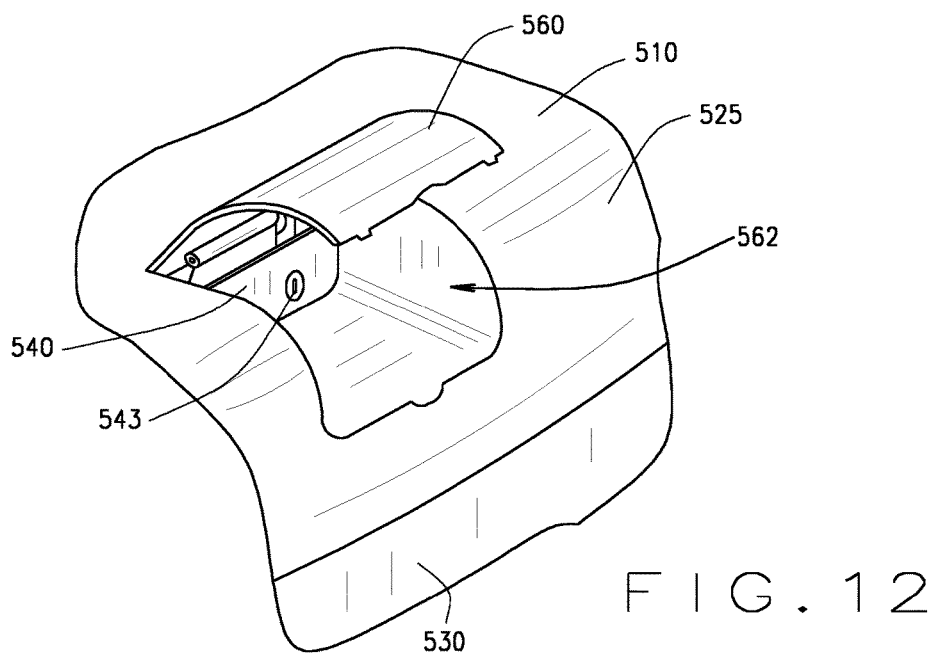
FIG. 12 is a perspective view of the hinged lid of the tonneau cover.

The latching mechanism 500 is generally attached or mounted to the tonneau cover 510. As shown in FIG. 12, the handle 540 may be positioned inside of a compartment 562 on the rear exterior surface 525 of the tonneau cover 510. A hinged lid 560 may close the compartment 562 to improve aesthetics by providing a clean appearance to the tonneau cover 510. Further, the hinged lid 560 reduces water, ice, and/or moisture from interfering with the latching mechanism 500.

The strikers 600 are positioned on the side rails 532, 534 to interact in a latching arrangement with the offsets 582. The strikers 600 are mounted in a stationary or fixed relationship relative to the tonneau cover 510. In the embodiment shown, the offsets 582 of the rods 580 engage and disengage with the two strikers 600. The strikers 600 are positioned on opposite sides of the bed 530 of the pick-up truck. The rods 580 extend the width of the tonneau cover 510. With reference to FIG. 19, the strikers 600 comprise a contact surface 620 and a latching surface 640. The contact surface 620 is a generally planar or a generally straight surface. The strikers 600 comprise an acute angle between the contact surface 620 and the latching surface 640. With reference to FIG. 19, the strikers 600 may include a base surface 650 and walls 660. The walls 660 may extend from the base surface 650 to form a channel 670, which contains the offset 582 as the offset 582 moves between the contact surface 620 and the latching surface 640.

In a closing action of the tonneau cover 510, an outer periphery 588 of the offset 582 contacts the contact surface 620 of the striker 600, and the offset 582 rotates as it slides on the contact surface 620 of the striker 600, compressing the spring loading mechanism 570 until the offset 582 reaches an end 625 of the contact surface 620, and the offset 582 then snaps by the action of the spring loading mechanism 570, to a resting position on the latching surface 640 of the striker 600. In the closing action of the tonneau cover 510, the operator need only slam or urge the tonneau cover 510 shut, as there is no need to actuate the handle 540. As described, the contact of the outer periphery 588 of the offset 582 to the contact surface 620 of the striker 600 causes the offset 582 to rotate. This contact of the offset 582 to the contact surface 620 overcomes the force of the spring loading mechanism 570 in the lock 200 causing the offset 582, and consequently to the rods 580, to rotate and compress the spring loading mechanism 570 until the offset 582 reaches the end 625 of the contact surface 620.

When the tonneau cover 510 is already in a closed position and the operator desires to open the tonneau cover 510, the operator pulls on the handle 540, which rotates the rods 580 and its offsets 582. The offset 582 is rotated from the latching surface 640, thus releasing the latching mechanism 500 such that the tonneau cover 510 may be opened.

The latching mechanism 500 provides two contact points, i.e., the strikers 600 on either side of the tonneau cover 510. This provides increased security. A first striker 600 may be positioned on an inside surface 533 of the side rail 532, while a second striker 600 may be positioned on an inside surface 535 of the side rail 534. The rods 580 may extend across the width of the tonneau cover 510 to engage the strikers 600 on the side rails 532, 534.

The rods 580 may rotate up to approximately 20 degrees to approximately 45 degrees. In this embodiment, this amount of rotation of the rods 580 provides for the offset 582 to slide on the contact surface 620 of the striker 600 and then snap to the latching surface 640. In other embodiments, the rods 580 may rotate up to approximately 150 or to approximately 180 degrees, depending upon the interface between the offset 582 and the striker 600. The amount of rotation needed will vary depending on the length of the transition portion 584, the size and shape of the striker 600, etc.

Although the handle 540 is shown in the Figures, other handles, pulls, push knobs, etc. may be used with the present invention to rotate the rods 580 to engage and disengage the rods 580 from the strikers 600.

The strikers 600 may be made from a variety of materials, including metals and or thermal plastics. The strikers 600 may be molded from thermal plastics.

In other aspects, the lock assembly 550 is configured to accommodate or integrated into a remote locking system of a vehicle's remote entry system. As such, the locking assembly 550 of the latching system 500 may be remotely unlocked via a key fob, dashboard, controls, and other controls.

In other aspects, the lock assembly 550 may be omitted from the latching mechanism 500. For example, in certain applications such as emergency vehicles, quick access to the bed 530 of the pick-up truck may be required and the lock assembly 550 is not used with the latching mechanism 500. The latching mechanism 500 still maintains the cover 510 in a closed and latched position; however, the cover 510 is not locked closed, i.e., anyone may unlatch the cover 510 by pulling on the handle 540.

Those skilled in the art will appreciate that variations from the specific embodiments disclosed above are contemplated by the invention. The invention should not be restricted to the above embodiments, but should be measured by the following claims.

What is claimed:

1. A locking mechanism assembly, comprising:
   a lock comprising a lock housing, a lock cylinder, an axle, a handle and a spring loading mechanism, wherein the handle is rotatably engaged to the spring loading mechanism;
   a striker comprising a locking surface and a contact surface, wherein the contact surface is generally planar, wherein the locking surface is generally planar, wherein an end of the locking surface joins an end of the contact surface at a point of intersection;
   a rod in a rotational engagement with the spring loading mechanism via the axle, wherein the rod has an offset that interacts with the striker in a locking relationship, and wherein the offset has a circular outer diameter;
   the axle operatively connected to the handle, and the axle configured to transfer movement of the handle to the rod, the spring loading mechanism being positioned around the axle;
   the rod and the offset rotate; and,
   the circular outer diameter of the offset contacts the contact surface of the striker and the circular outer diameter of the offset rotates as it slides against the contact surface of the striker and compresses the spring loading mechanism until the circular outer diameter of the offset reaches the point of intersection and the offset rotates past the point of intersection and under the striker by the action of the spring loading mechanism, to a resting position on the locking surface of the striker.

2. The locking mechanism assembly of claim 1, wherein the locking surface is on a rear side of the striker, wherein the contact surface is on a front side of the striker, and wherein a whole of the circular outer diameter of the offset rotates past the point of intersection and under the striker by the action of the spring loading mechanism, to the resting position on the locking surface of the striker.

3. The locking mechanism assembly of claim 1, wherein the rod comprises a central axis with a transition portion and the offset.

4. The locking mechanism assembly of claim 3, wherein the central axis includes a first bend leading to the transition portion and a second bend from the transition portion leading to the offset.

5. The locking mechanism assembly of claim 1, wherein the striker is fixed, wherein the striker includes a generally triangular shape with a body portion of the striker between the locking surface and the contact surface, and wherein the contact surface is on a front side of the striker and the locking surface is on a rear side of the striker, and the offset rotates from the front side, past the point of intersection, and to the rear side.

6. The locking mechanism assembly of claim 1, wherein the offset rotates past the point of intersection and snaps under the striker by the action of the spring loading mechanism to the resting position on the locking surface of the striker with the circular outer diameter of the offset resting against the locking surface of the striker.

7. The locking mechanism assembly of claim 6, wherein the striker includes a generally triangular shape with a body portion of the striker between the locking surface and the contact surface, wherein an acute angle is formed between the locking surface and the contact surface.

8. The locking mechanism assembly of claim 1, wherein the lock is rotatably engaged with the rod and another rod, wherein the spring loading mechanism comprises a spring, and the spring loading mechanism operably connects the handle to the rods via the axle.

9. The locking mechanism assembly of claim 1, wherein the offset has an axis, and the offset rotates about it axis.

10. A storage container, comprising:
    a plurality of walls defining or forming a container;
    the container comprising a striker, wherein the striker is fixed in position;
    the striker comprising a locking surface and a contact surface, wherein the contact surface is generally planar, wherein the locking surface is generally planar, wherein an end of the locking surface joins an end of the contact surface at a point of intersection;
    a lock comprising a handle, a lock cylinder, an axle, and a spring loading mechanism, wherein the handle is rotatably engaged to the spring loading mechanism;
    a rod in a rotational engagement with the spring loading mechanism via the axle, the rod having an offset that interacts with the striker in a locking relationship, and wherein the offset has a circular outer diameter;
    the axle operatively connected to the handle, and the axle configured to transfer movement of the handle to the rod, the spring loading mechanism being positioned around the axle;
    the rod and the offset rotate;
    the circular outer diameter of the offset contacts the contact surface of the striker and the circular outer diameter of the offset rotates as it slides against the contact surface of the striker and compresses the spring loading mechanism until the circular outer diameter of the offset reaches the point of intersection and the offset rotates past the point of intersection and under the striker by the action of the spring loading mechanism, to a resting position on the locking surface of the striker; and, a lid hingedly connected to the container.

11. The storage container according to claim 10, wherein the handle translates a pulling force to a rotational force that rotates the rod.

12. The storage container according to claim 10, wherein the offset of the rod rotates against and around the striker to secure the lid in a closed position.

13. The storage container according to claim 10, wherein the striker includes a generally triangular shape with a body portion of the striker between the locking surface and the contact surface, wherein an acute angle is formed between the locking surface and the contact surface, wherein the offset rotates past the point of intersection and snaps under the striker by the action of the spring loading mechanism to the resting position on the locking surface of the striker with the circular outer diameter of the offset resting against the locking surface of the striker.

14. The storage container according to claim 10, wherein the lock is in operational communication with two rods and two strikers, and the strikers are positioned on opposite sides of the container.

15. The storage container according to claim 14, where each of the two rods pass through brackets mounted on the lid.

16. The storage container according to claim 10, wherein pushing the lid to a closed position on the container actuates the lock to a locked position which maintains the lid in the closed position.

17. The storage container according to claim 10, wherein a pulling force on the handle overcomes the spring loading mechanism and rotates the rod to an open position for opening the lid.

18. The storage container according to claim 10, wherein a pulling force on the handle overcomes the spring loading mechanism and rotates the rod and its offset from the locking surface of the striker and around the striker.

19. The storage container according to claim 10, wherein the spring loading mechanism urges the lock to a closed position.

20. A toolbox having a slam latch, comprising:

a plurality of walls defining or forming a container having a rim;

the container comprising a plurality of strikers proximate the rim in a stationary configuration;

the plurality of strikers comprising a locking surface and a contact surface, wherein the contact surface is generally planar, wherein the locking surface is generally planar, wherein an end of the locking surface joins an end of the contact surface at a point of intersection;

a lock comprising a handle, a lock cylinder, a spring loading mechanism, and an axle;

a plurality of rods in rotational engagement with the spring loading mechanism, via the axle, the axle operatively connected to the handle, and the axle configured to transfer movement of the handle to the plurality of rods, the spring loading mechanism being positioned around the axle; wherein each rod includes a first bend leading to a transition portion and a second bend from the transition portion leading to a offset, wherein the offset rotates, and each offset interacts with one of the plurality of strikers in a locking relationship, and wherein each offset has a circular outer diameter;

the circular outer diameter of the offset contacts the contact surface of the striker and the circular outer diameter of the offset rotates as it slides against the contact surface of the striker and compresses the spring loading mechanism until the circular outer diameter of the offset reaches the point of intersection and the offset rotates past the point of intersection and under the striker by the action of the spring loading mechanism, to a resting position on the locking surface of the striker;

the spring loading mechanism urging the rods to a locked position; and, a lid hingedly connected to the container, wherein the lock is mounted on or into the lid.

\* \* \* \* \*